US012490817B2

United States Patent
Seidman

(10) Patent No.: US 12,490,817 B2
(45) Date of Patent: Dec. 9, 2025

(54) CONVERTIBLE BAG

(71) Applicant: The Seidline Group, LLC, Scarsdale, NY (US)

(72) Inventor: Pamela Seidman, Scarsdale, NY (US)

(73) Assignee: THE SEIDLINE GROUP, LLC, Scarsdale, NY (US)

( * ) Notice: Subject to any disclaimer, the term of this patent is extended or adjusted under 35 U.S.C. 154(b) by 60 days.

(21) Appl. No.: 18/427,169

(22) Filed: Jan. 30, 2024

(65) Prior Publication Data

US 2024/0251920 A1 Aug. 1, 2024

Related U.S. Application Data

(60) Provisional application No. 63/442,165, filed on Jan. 31, 2023.

(51) Int. Cl.
| | |
|---|---|
| A45C 7/00 | (2006.01) |
| A45C 13/02 | (2006.01) |
| A45C 13/10 | (2006.01) |
| A45C 13/30 | (2006.01) |
| A45C 3/00 | (2006.01) |
| A45C 3/10 | (2006.01) |

(52) U.S. Cl.
CPC ............ *A45C 7/0077* (2013.01); *A45C 13/02* (2013.01); *A45C 13/1046* (2013.01); *A45C 13/30* (2013.01); *A45C 2003/002* (2013.01); *A45C 3/10* (2013.01)

(58) Field of Classification Search
CPC ... A45C 7/0077; A45C 13/02; A45C 13/1046; A45C 13/30; A45C 3/10; A45C 2003/002; B65D 33/28
USPC ......................................................... 383/2, 75
See application file for complete search history.

(56) References Cited

U.S. PATENT DOCUMENTS

| | | | | |
|---|---|---|---|---|
| 5,288,150 | A | * 2/1994 | Bearman | A45C 3/00 383/117 |
| 2004/0208397 | A1 | * 10/2004 | Yi | A45C 3/04 383/22 |
| 2006/0201979 | A1 | * 9/2006 | Achilles | A45C 3/04 383/38 |
| 2009/0078731 | A1 | * 3/2009 | Yi | A45C 3/04 224/572 |
| 2009/0101253 | A1 | * 4/2009 | Kinskey | A45C 13/126 150/107 |
| 2010/0084443 | A1 | * 4/2010 | Adelman | A45C 7/0059 224/153 |

(Continued)

FOREIGN PATENT DOCUMENTS

JP 3196905 U * 4/2015

OTHER PUBLICATIONS

Machine translation of JP-3196905-U. (Year: 2015).*

*Primary Examiner* — Jes F Pascua
(74) *Attorney, Agent, or Firm* — Myers Wolin, LLC

(57) ABSTRACT

A bag is provided having a bag body, at least one handle attached to the bag body, and an upper trim defining an internal channel at an upper border of the bag body. At least one drawstring is then provided partially enclosed within the internal channel. The drawstring is configured to cinch the bag at the upper trim. When in a first duffle configuration, the bag at is uncinched at the upper trim and when in a second tote configuration, the bag is cinched at the upper trim.

9 Claims, 9 Drawing Sheets

(56) References Cited

U.S. PATENT DOCUMENTS

| | | | |
|---|---|---|---|
| 2011/0198376 A1* | 8/2011 | Oh | B62B 3/1464 |
| | | | 224/411 |
| 2013/0156351 A1* | 6/2013 | Kern | A45C 3/04 |
| | | | 383/39 |
| 2018/0242701 A1* | 8/2018 | Seiders | A45C 13/008 |
| 2022/0410954 A1* | 12/2022 | Liu | B62B 3/1472 |

* cited by examiner

CONVERTIBLE BAG

CROSS REFERENCE TO RELATED APPLICATIONS

This application takes priority from U.S. Provisional Patent Application No. 63/442,165, filed Jan. 31, 2023, the contents of which are incorporated by reference herein.

FIELD OF THE INVENTION

The present invention relates to a convertible bag. More particularly, the present invention relates to a bag having a duffle bag configuration and a tote bag configuration.

BACKGROUND

At some times, a person may require a duffle bag, while at other times, a person may require a smaller tote bag. For example, while shopping, a person may want to use a tote bag, but upon purchasing an item larger than the interior space of the tote bag, the person may instead require a duffle bag.

There is therefore a need for a bag that can be converted between two distinct configurations in order to modify the size of the bag.

Further, in providing a more versatile bag, the same bag may be used for varying purposes, such as both a tote bag for shopping and a beach bag. As such, sand from the beach may enter the bag and be difficult to remove.

There is a further need for a versatile bag that can be used in different contexts, while allowing for easy cleaning and easy removal of sand.

SUMMARY

In some embodiments, a bag is provided having a bag body, at least one handle attached to the bag body, and an upper trim defining an internal channel at an upper border of the bag body.

At least one drawstring is then provided partially enclosed within the internal channel. The drawstring is configured to cinch the bag at the upper trim. When in a first duffle configuration, the bag at is uncinched at the upper trim and when in a second tote configuration, the bag is cinched at the upper trim.

In some embodiments, the at least one handle is at least a pair of handles, each located opposite each other and extending from the upper trim at a fixation point. The drawstring then extends from and terminates at the fixation point.

In some such embodiments, the bag includes a second pair of handles, where each handle of the first pair of handles has a first length and each handle of the second pair of handles has a second length shorter than the first length.

In some embodiments having a pair of handles extending from fixation points, the at least one drawstring is two drawstrings, and the at least one pair of handles are each located on opposite surfaces of the bag, and each drawstring emerges from the upper trim at a location spaced apart from the pair of handles and opposite each other.

In some such embodiments, the two drawstrings cinch the spaces opposite each other and between the handles, such that the handle remains centered on the bag in both the first duffle configuration and the second tote configuration.

In some embodiments, the bag comprises two side panels and two end panels, where the side panels have a width larger than a width of the end panels, and where the at least one pair of handles are located at the side panels and where the drawstrings emerge from the end panels.

In some embodiments, the bag further includes an inner or outer mesh pocket.

In some embodiments, the bag further includes a removable pouch where the removable pouch is securable to an internal surface of the bag and where the bag other than the removable pouch fits within the removable pouch in a collapsed configuration.

In some embodiments, the bag further includes at least one strainer at a bottom surface of the bag.

DETAILED DESCRIPTION OF THE PREFERRED EMBODIMENTS

Figure 1:
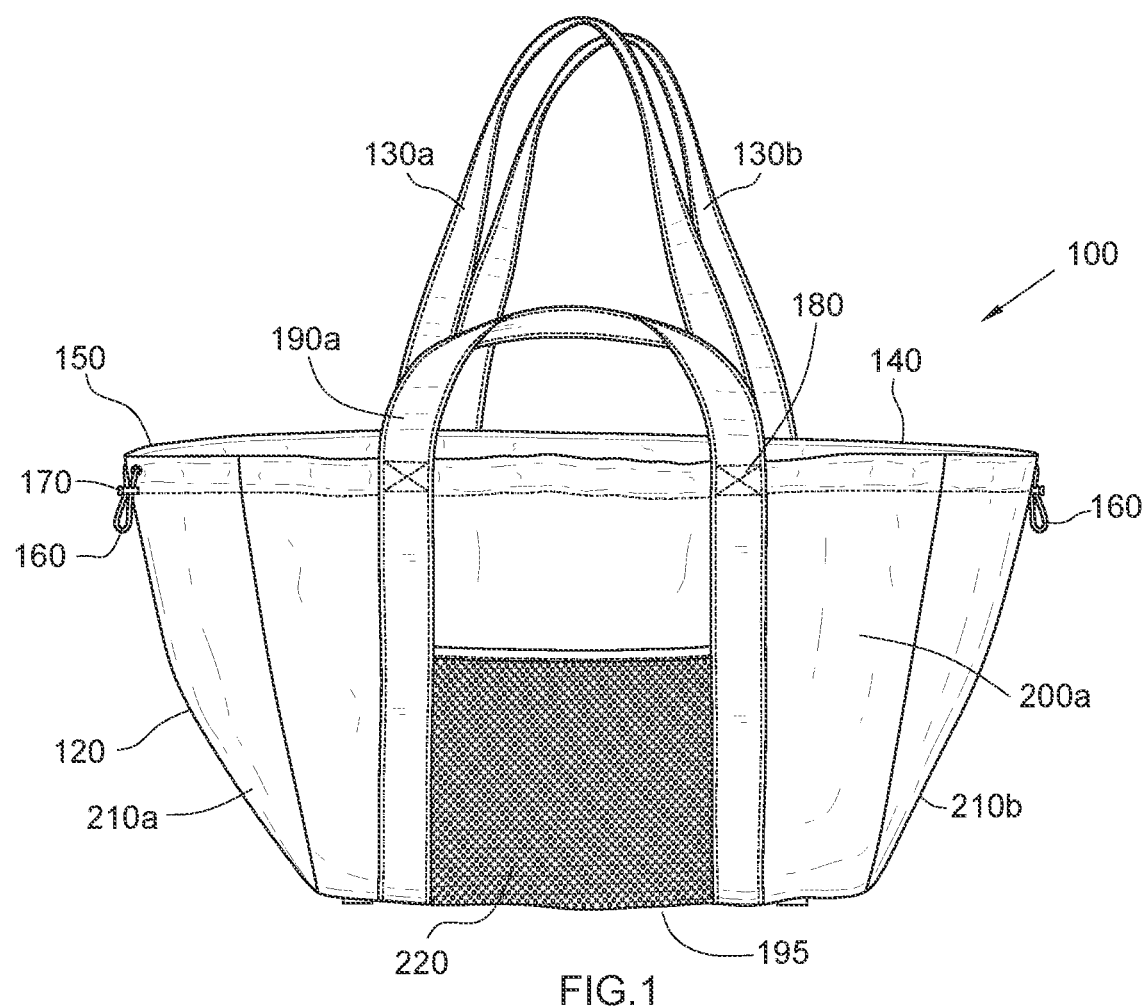
FIG. 1 is a front view of a convertible bag in accordance with this disclosure in a duffle configuration.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
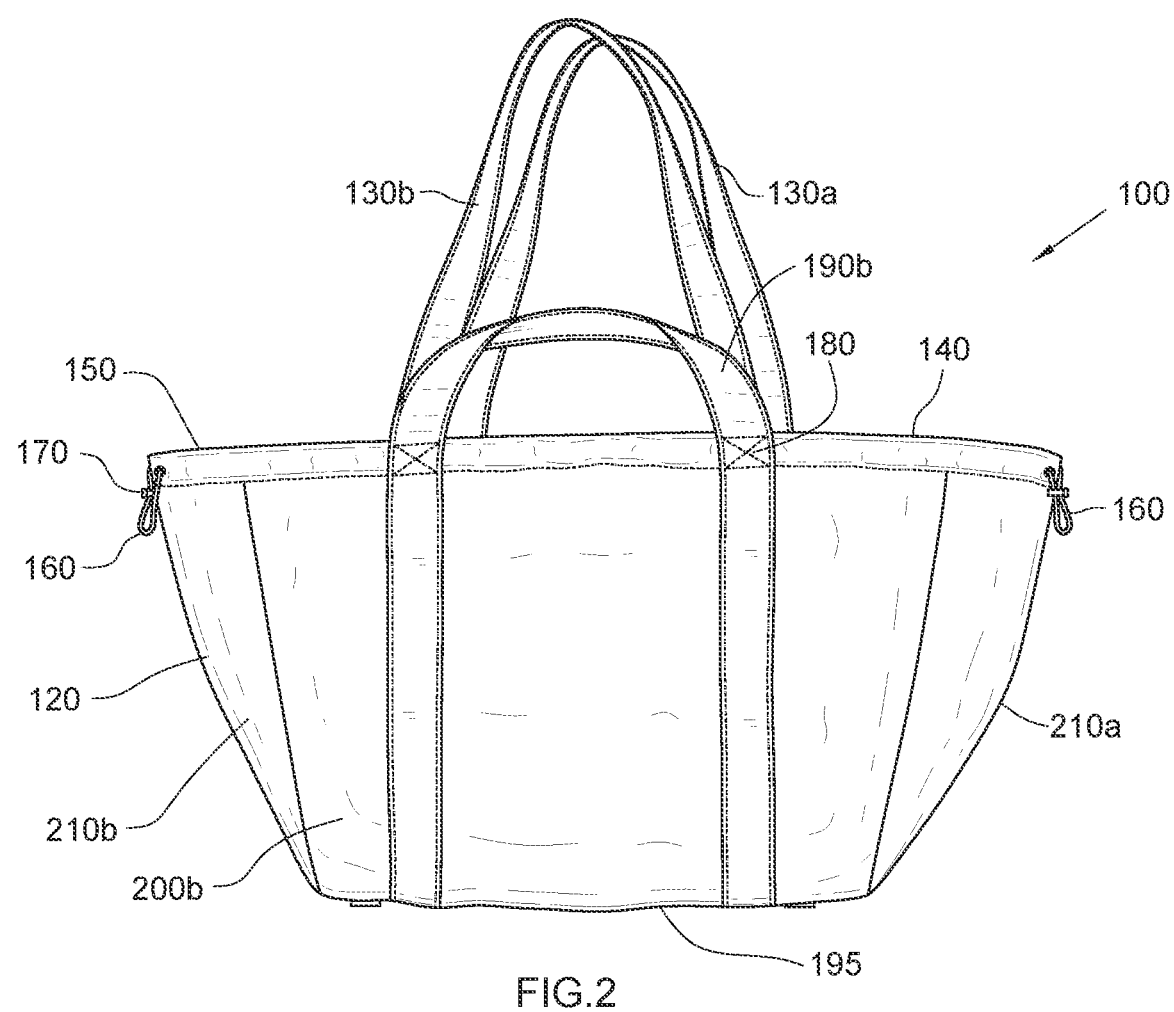
FIG. 2 is a rear view of the convertible bag of FIG. 1 in the duffle configuration.
Figure 3:
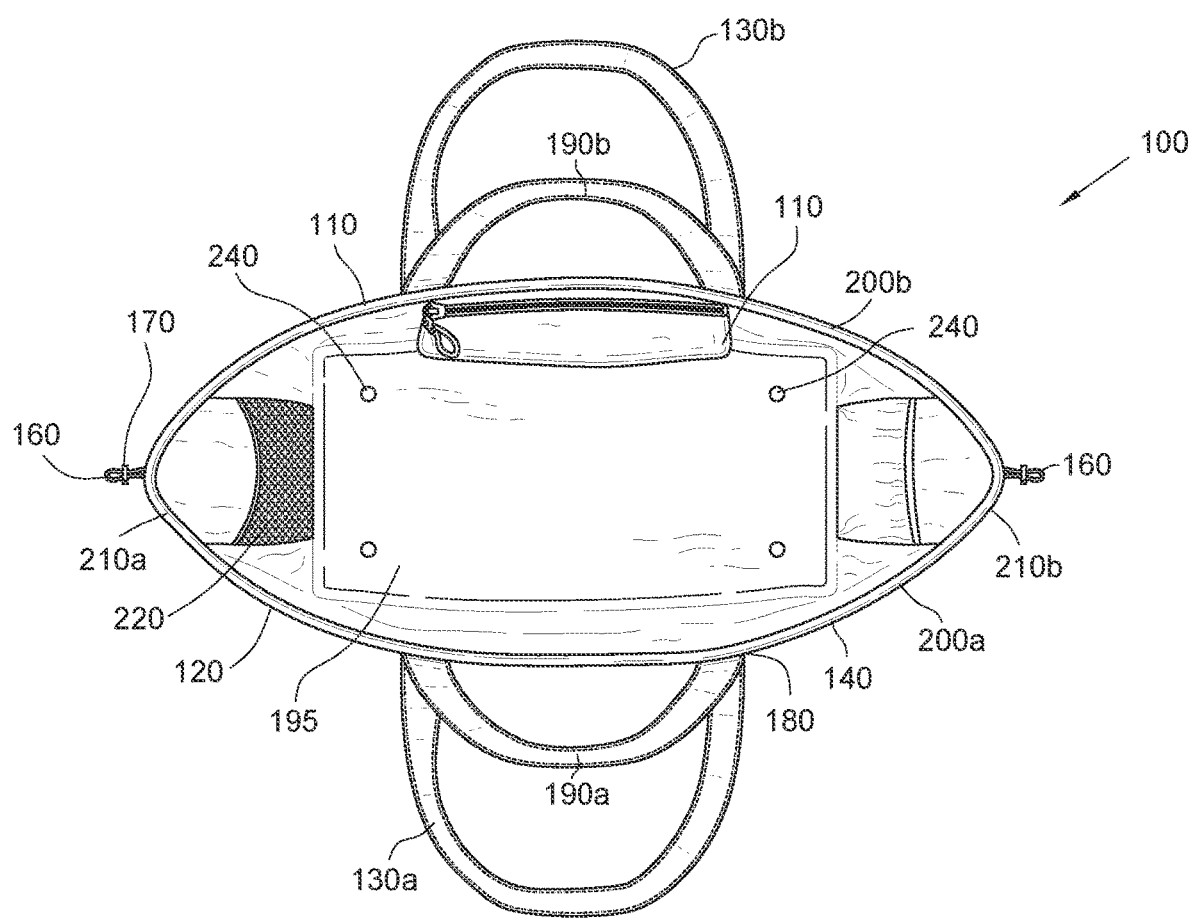
FIG. 3 is a top view showing an interior of the convertible bag of FIG. 1 in the duffle configuration.

FIG. 1 is a front view of a convertible bag 100 in accordance with this disclosure in a duffle configuration. FIG. 2 is a rear view of the convertible bag 100 of FIG. 1. FIG. 3 is a top view of the convertible bag 100 of FIG. 1.

Figure 4:
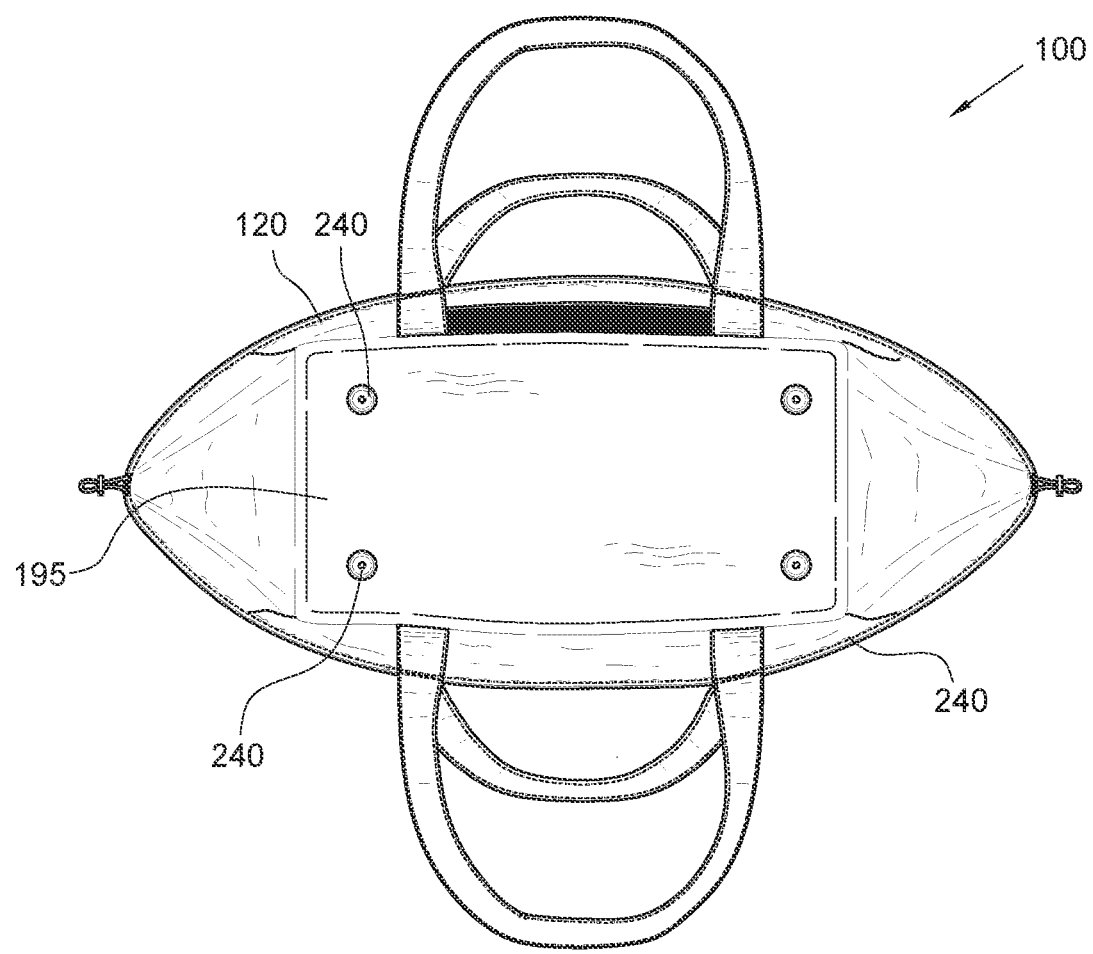
FIG. 4 is a bottom view of the convertible bag of FIG. 1 in the duffle configuration.
Figure 5:
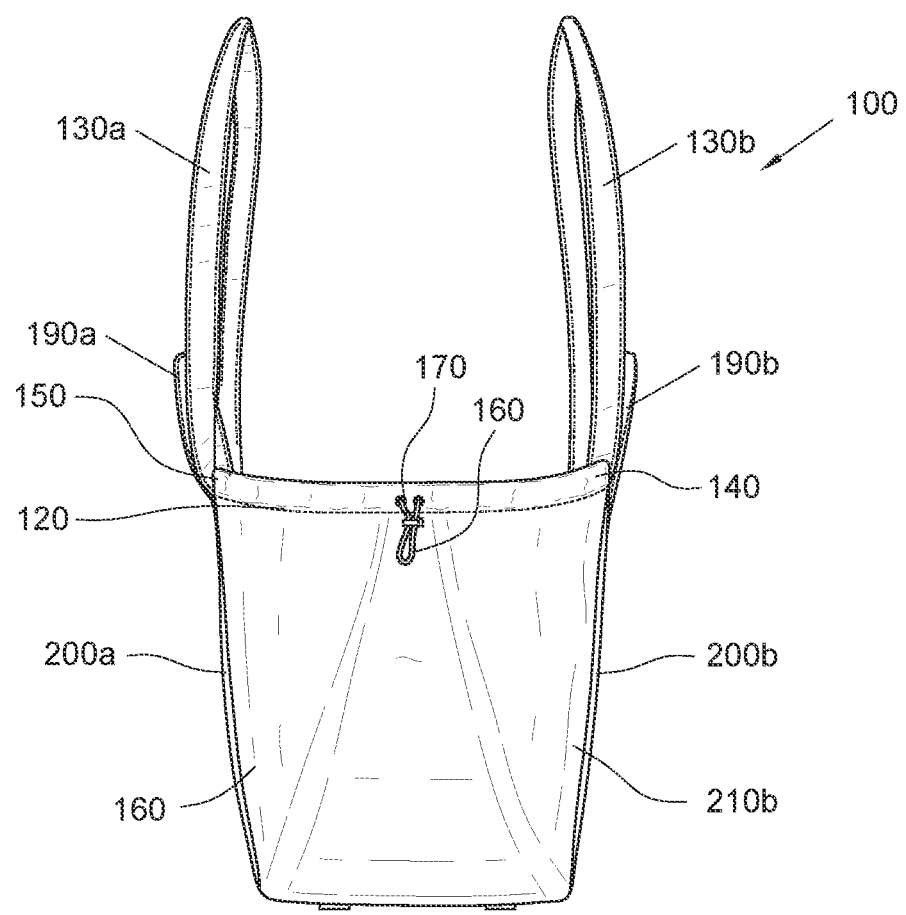
FIG. 5 is a side view of the convertible bag of FIG. 1 in the duffle configuration.

FIG. 4 is a bottom view of the convertible bag 100 of FIG. 1. FIG. 5 is a side view of the convertible bag 100 of FIG. 1.

Figure 6:
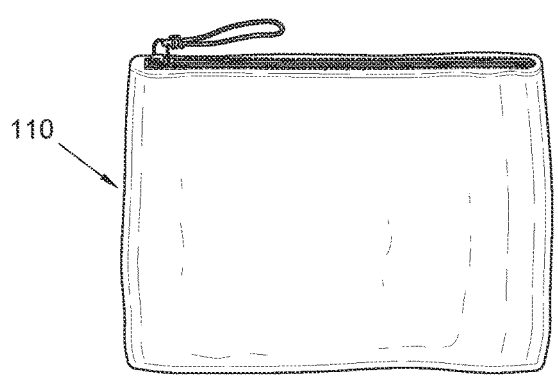
FIGS. 6 and 7 are front and back views of a pouch for use with the convertible bag of FIG. 1.
Figure 7:
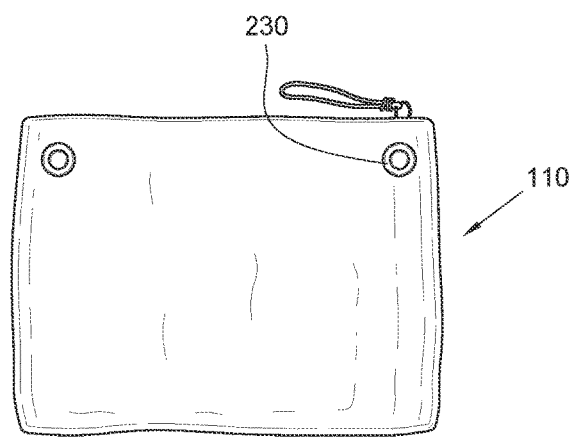

FIGS. 6 and 7 are front and back views of a pouch 110 for use with the convertible bag 100 of FIG. 1.

Figure 8:
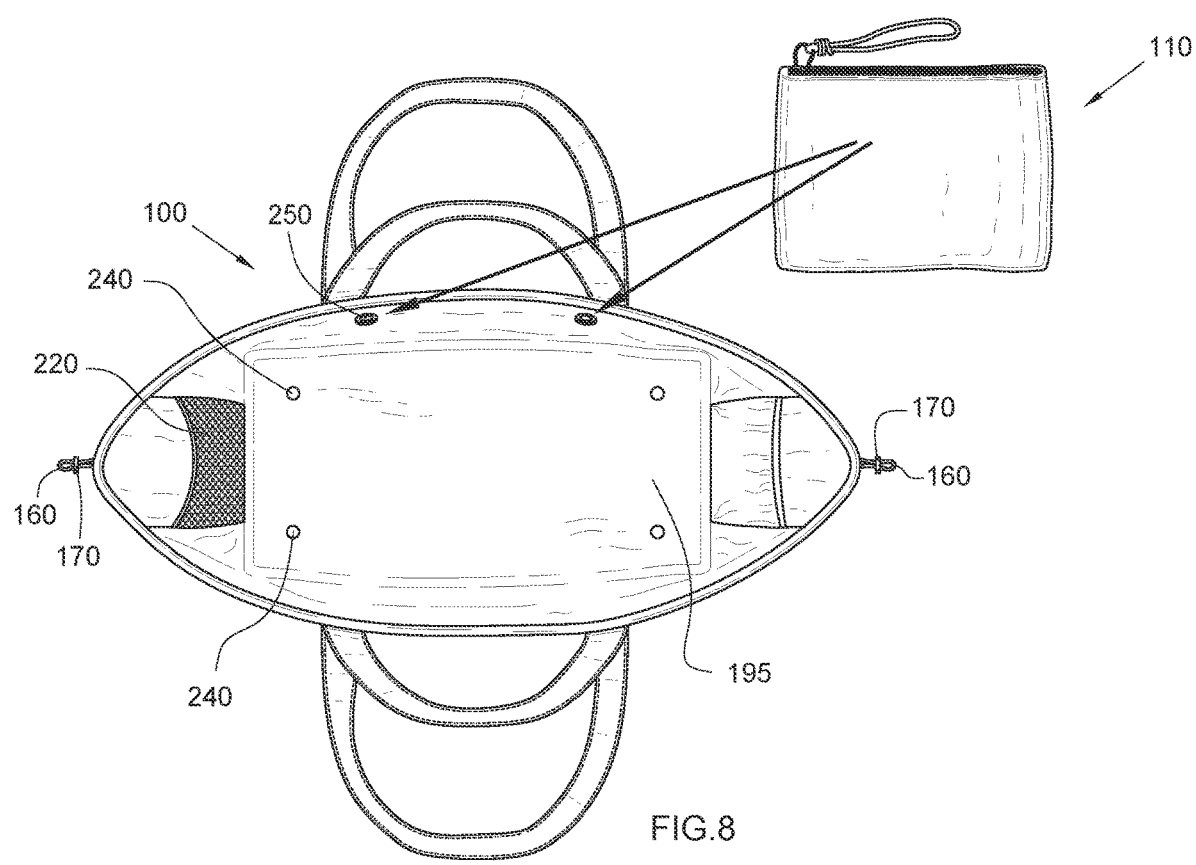
FIG. 8 is a top view showing an interior of the convertible bag of FIG. 1 with the pouch of FIG. 6 removed.

FIG. 8 is a top view showing an interior of the convertible bag 100 of FIG. 1 shown with the pouch 110 removed.

Figure 9:
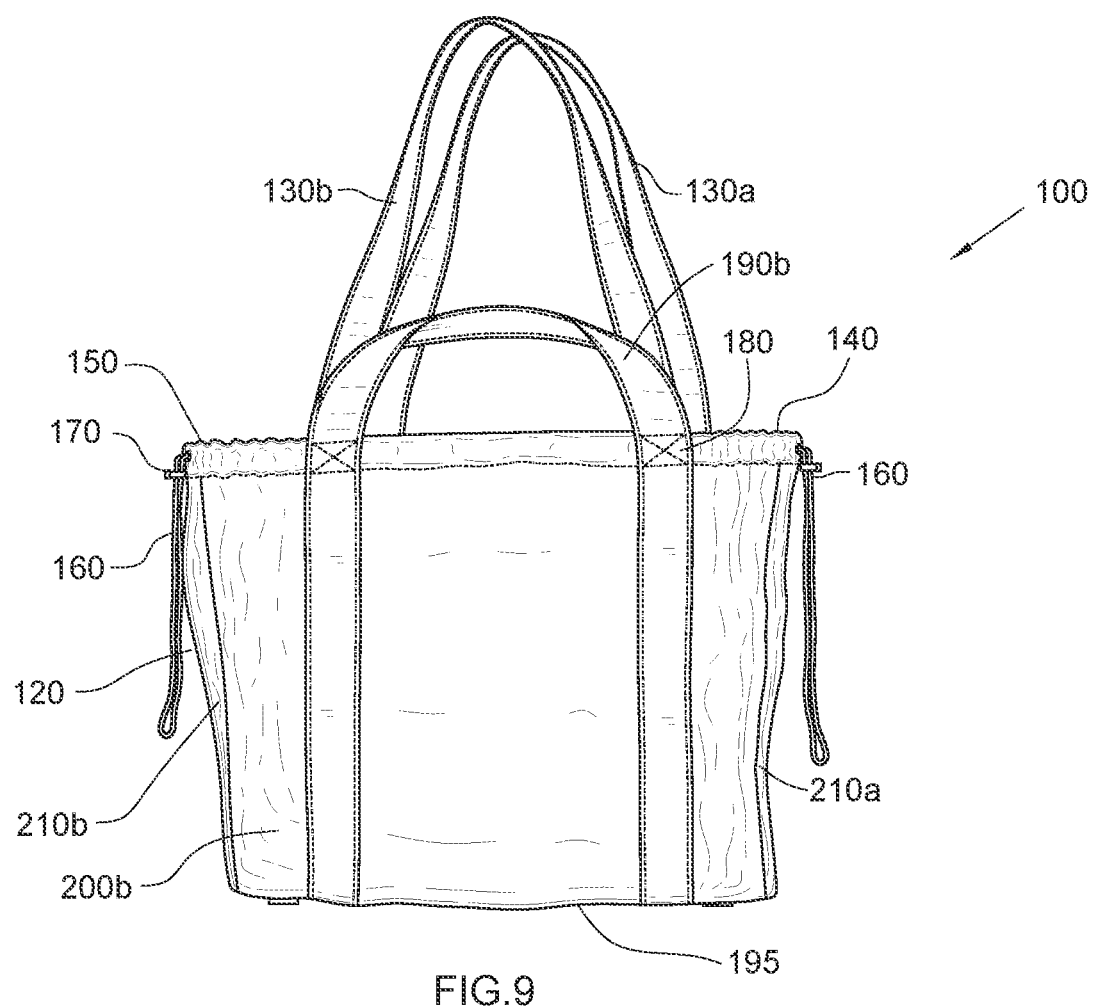
FIG. 9 is a rear view of the convertible bag of FIG. 1 in a tote configuration.
Figure 10:
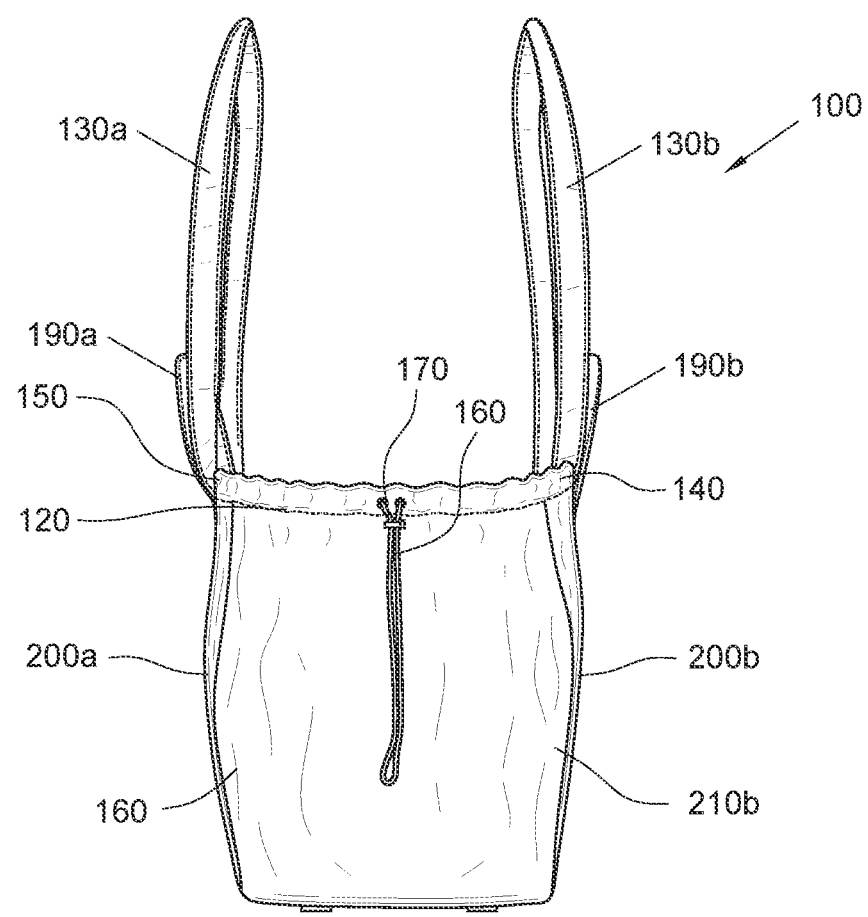
FIG. 10 is a side view of the convertible bag of FIG. 1 in the tote configuration.

FIG. 9 is a rear view of the convertible bag 100 of FIG. 1 in a tote configuration. FIG. 10 is a side view of the convertible bag 100 of FIG. 1 in the tote configuration.

As shown, a convertible bag 100 is provided having a bag body 120, at least one handle 130*a, b* attached to the bag body, and an upper trim 140 defining an internal channel at an upper border 150 of the bag body. A drawstring 160 is then provided and partially enclosed within the internal channel defined by the upper trim 140. The drawstring 160 is configured to cinch the bag body 120 at the upper trim 140.

The convertible bag 100 is then convertible between two configurations. In a first configuration, or a duffle configuration, the bag body 120 is uncinched at the upper trim 140 by the drawstring 160. In the second configuration, or tote bag configuration, the bag body 120 is cinched at the upper trim 140 by the drawstring 160.

The drawstring 160 may utilize a corresponding cord lock 170 for locking the drawstring in a cinched or uncinched configuration. While FIGS. 1-8 generally show the uncinched configuration, FIGS. 9 and 10 show the use of the cord lock 170 in a cinched, or partially cinched, tote bag configuration.

As shown, the at least one handle may be a first pair of handles 130*a, b*, with each handle being located opposite the other handle on the bag body 120. Each handle 130*a, b* may then extend from the upper trim 140 at one or two fixation points 180. The drawstring 160 may then extend from and terminate at the fixation point 180 within the internal channel defined by the upper trim 140.

As shown, the bag 100 may include a second pair of handles 190*a, b* in addition to the first pair of handles. For example, each handle of the first pair of handles 130*a, b* may have a first length and each handle of the second pair of handles 190*a, b* may have a second length different from the length of the first handles. For example, the first pair of handles 130*a, b* may be sized for use as a shoulder bag, while the second pair of handles 190*a, b* may be sized for grasping by a user with their hands. As such, the handles of the second pair of handles 190*a, b* may be shorter than the handles of the first pair of handles 130*a, b*.

In some embodiments, as shown, one or both of the pairs of handles 130*a, b*, 190*a, b* may comprise fabric that extends down the front and back faces of the bag body 120. Such fabric may be functional in directly fixing the handles to a bottom 195 of the bag body 120, thereby enhancing stability of the bag, or in some embodiments, it may be aesthetic.

In the embodiment shown, two drawstrings 160 are provided, generally on opposite sides of the bag body 120 from each other. Accordingly, the handles 130*a, b* are similarly located opposite each other, and the drawstrings 160 emerge from the upper trim 140 at locations spaced apart from the pair of handles and opposite each other.

In the configuration shown, the two drawstrings 160 are therefore opposite each other between the handles 130*a, b*. Accordingly, the handles 130*a, b* are centered on the bag in the duffle configuration when the bag body 120 is uncinched and the handles then remain centered on the bag in the tote configuration when the bag body is cinched by the two drawstrings 160.

In order to support such a structure, the bag body 120 may comprise two side panels 200*a, b* and two end panels 210*a, b*. The side panels 200*a, b* may then have a width larger than a width of the end panels 210*a, b*. Accordingly, the handles 130*a, b* are each located on the side panels 200*a, b*, and are typically centered, while the drawstrings 160 emerge from the trim 140 at the end panels 210*a, b*.

In some embodiments, the bag 100 may further be provided with at least one mesh pocket 220. Such a mesh pocket 220 may be provided at an outer surface of one of the side panels 200*b*, or may be provided at an internal surface of the bag body 120.

In some embodiments, the bag 100 may further include a removable pouch 110, as shown. The removable pouch 110 may be securable to an internal surface of the bag, and may then include some fixation means 230. For example, the removable pouch 110 may be snappable to an internal mating surface of the bag body 120, and as such may be provided with male or female snapping elements 230. The bag body 120 may then be provided with corresponding snapping elements 250. Alternatively, or in addition, the removable pouch 110 may be fixable to the interior mating surface of the bag body 120 using a zipper or other fixation means.

In some embodiments, in addition to the two use configurations described above, namely the duffle configuration shown in FIGS. 1-5 and 8 and the tote configuration shown in FIGS. 9-10, the bag body 120 may also have a collapsed configuration, and the bag body 120 may then fit inside the removable pouch 110 in the collapsed configuration, allowing for convenient storage.

As shown, in some embodiments, the bag 100 may further include at least one strainer 240, such as a sand strainer. Such a strainer 240 may be provided on a bottom surface 195 of the bag body 120. In the example shown, four such strainers 240 are provided.

As shown, the fixation points 180 may be reinforced with cross stitching in order to secure the handles 130*a, b*, 190*a, b*. Further, additional interior pockets may be provided, resulting in one interior pocket at each end panel 210*a, b*. In the embodiment shown, one such pocket is a mesh pocket 220, while the second pocket is made of the same fabric as the bag body 120.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwith-

What is claimed is:

1. A bag comprising:
a bag body;
at least one handle attached to the bag body;
an upper trim defining an internal channel at an upper border of the bag body; and
at least one drawstring partially enclosed within the internal channel, wherein the drawstring is configured to cinch the bag at the upper trim;
wherein in a first duffle configuration, the bag is uncinched at the upper trim and in a second tote configuration the bag is cinched at the upper trim, and
wherein the at least one handle comprises at least one pair of handles each located opposite each other and extending from the upper trim at a fixation point, and wherein the at least one drawstring extends from and terminates at the fixation point.

2. The bag of claim 1 further comprising a second pair of handles, wherein each handle of the first pair of handles has a first length and each handle of the second pair of handles has a second length shorter than the first length.

3. The bag of claim 1 wherein the at least one drawstring is two drawstrings, and wherein the at least one pair of handles are each located on opposite surfaces of the bag and each drawstring emerges from the upper trim at a location spaced apart from the pair of handles and opposite each other.

4. The bag of claim 3, wherein the two drawstrings cinch the spaces opposite each other and between the handles, such that the handle remains centered on the bag in both the first duffle configuration and the second tote configuration.

5. The bag of claim 3 further comprising two side panels and two end panels, wherein the side panels have a width larger than a width of the end panels, and wherein the at least one pair of handles are located at the side panels and wherein the drawstrings emerge from the end panels.

6. The bag of claim 1 further comprising an inner or outer mesh pocket.

7. The bag of claim 1 further comprising a removable pouch wherein the removable pouch is securable to an internal surface of the bag and wherein the bag other than the removable pouch fits within the removable pouch in a collapsed configuration.

8. The bag of claim 7 further comprising at least one strainer at a bottom surface of the bag.

9. The bag of claim 1 further comprising at least one strainer at a bottom surface of the bag.

* * * * *